J. M. FOSTER.
POULTRY EXERCISER AND FEEDER.
APPLICATION FILED SEPT. 26, 1913.
1,108,566.
Patented Aug. 25, 1914.
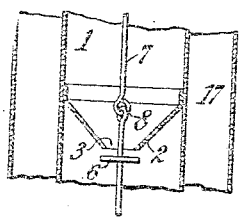
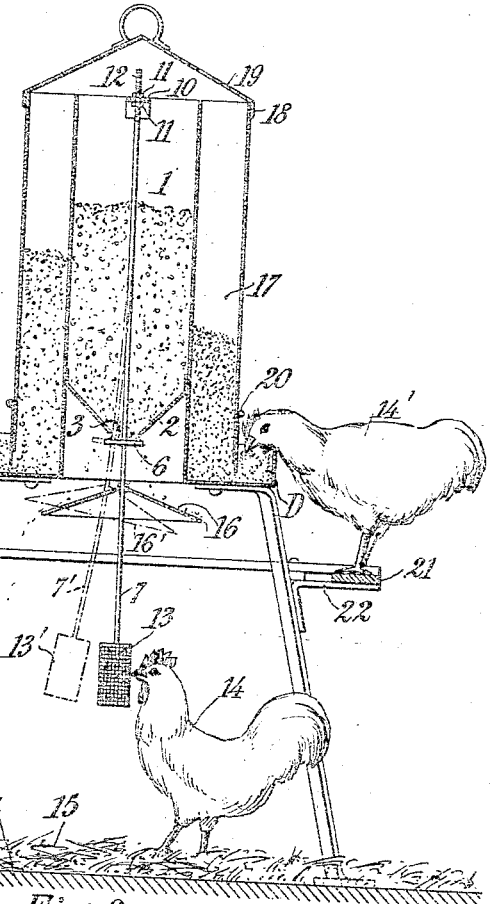
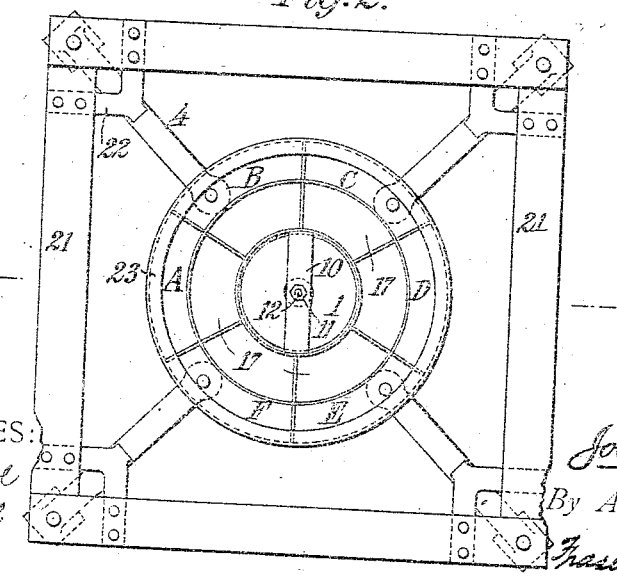
WITNESSES:
INVENTOR:
Joel M. Foster,
By Attorneys,

UNITED STATES PATENT OFFICE.

JOEL M. FOSTER, OF BROWN MILLS, NEW JERSEY.

POULTRY EXERCISER AND FEEDER.

1,108,566.   Specification of Letters Patent.   Patented Aug. 25, 1914.

Application filed September 26, 1913. Serial No. 792,066.

*To all whom it may concern:*

Be it known that I, JOEL M. FOSTER, a citizen of the United States, residing at Brown Mills, in the county of Burlington and State of New Jersey, have invented certain new and useful Improvements in Poultry Exercisers and Feeders, of which the following is a specification.

This invention relates to a poultry exerciser and feeder, and has for an object to associate an exerciser with a device for controlling the distribution of scratch feed, and to locate one or more feed troughs in such position that the spillings therefrom will fall on the feeding floor in the zone of scratch feed distribution, and to closely assemble a plurality of feed distributers.

In the drawings accompanying this specification one practicable embodiment of a form of the invention is illustrated, in which drawings—

Figure 1 is a vertical central section of the device; Fig. 2 is a top plan view; and Fig. 3 is a detail of a swivel.

The scratch feed container 1 is shown in the form of a cylinder having at its bottom a sloping or funnel-shaped discharge 2 which is provided with a discharge opening 3. This cylinder is shown supported by suitable standards, in the present illustration four legs 4, which hold the container at a suitable distance from the feeding floor 5.

A disk 6 is provided for forming a closure for the discharge 3. Such disk is flexibly supported and in the present illustration is carried by a pendulous rod 7 which extends through the scratch feed container 1. This rod is shown adjustably carried by a crossbar 10 at top of the container 1. The position of the bar may be adjusted from time to time as occasion may demand, owing to the quantity of feed which it is desired shall be discharged, or owing to the size of the feed, by means of set nuts 11, 11, carried by the screwthreaded end 12 of the rod 7. The nuts 11, 11 are located upon the top and bottom respectively of the cross-bar 10. In Fig. 1 the rod 7 is shown resilient and rigidly connected to the cross-bar. In some instances it is desirable to form the rod 7 in two parts jointed together. An eye or link connection is shown at 8 in Fig. 3.

The rod 7 is illustrated as comprising a portion of the exerciser and carries at a suitable height for the purpose a bait container 13 in which some suitable feed or attractive material will be placed to induce the bird, as 14, to peck at the bait container for the purpose of swinging the bar and shifting the closure 6 relatively to the opening 3. The closure will be returned to normal position by the weight of the associated parts.

Straw or other material 15 is preferably placed upon the feeding floor 5, and when a hungry bird sees the bait within the container 13, it will proceed to peck upon the container 13, whereupon the bait and the rod 7 swing away from the bird, for instance into the dotted line position 7', 13', which moves the closure into such position that a certain amount of scratch feed is discharged and falls upon the feeding floor. The bird upon seeing the feed thus falling will turn its attention to gathering the feed from the floor.

For the purpose of distributing the scratch feed over a larger zone than it would otherwise fall upon, a deflector 16 is provided, which in the present illustration is carried by the rod 7 and swings therewith. This deflector is shown umbrella shaped, and will distribute the feed in a suitable zone so that the bird to gather it will have to search among the straw or other material 15 upon the feeding floor. The distributor when moved into the dotted line position 16' will cause the scratch feed to be distributed on the floor adjacent the bird, rather than upon the other side, so that the feed falling upon and around the bird will detract its attention from the bait.

In poultry raising, it is necessary in order to keep the birds in good healthy condition and produce the maximum number of eggs, that the birds be fed a variety of substances, such as grit, cracked oyster shells, charcoal, bran or dry mash, and chopped dried meat. It is common practice among poultry men to feed these different substances in separate vessels placed throughout the poultry yard or coop. The vessels require a certain amount of attention and care, and the poultry man loses considerable time in going from dish to dish, besides the liability of overlooking one or more, which if overlooked would probably be the most important. Furthermore, a bird feeding from such separate vessel, is liable to gorge itself or over-feed with that particular material, rather than getting a proper proportion of the various foods provided. In the present improvement, however, a plurality of feed troughs A, B, C, D, E and F are shown arranged adjacent to one another and also adjacent the feeding floor. Each of these troughs is shown connected with a reservoir 17. These reservoirs are arranged in the present showing around the outside of the main container 1, and have their upper open ends upon a plane with the upper open end of said main container. Such troughs and the containers are shown as mating segments forming complete cylinders. This is for the purpose of cleanliness and economy of space, and also that the flange 18 of a universal cover 19 may fit over the outer sides of the containers 17 and so cover all the containers. By the removal of this one cover all the containers will be exposed to view and may all be filled or given attention at the same time. It may be desirable at times to shut off one or more of the troughs, and for this purpose slides 20 are provided. If a bird is feeding from one of the troughs, say from the trough F, and seeing the feed in the adjacent troughs A and E, its attention will be more or less distracted from the feed in the trough it is feeding from, which has a tendency to prevent it over-feeding from this particular trough. The tendency is for the bird to go to the trough and take that kind of feed which its system calls for first, and having taken a reasonable amount as required by its system, it will instinctively leave for one or more of the other feeds to which its attention is attracted, until satisfied. Otherwise, for instance, if the dried meat trough is located at a distance from the other feed troughs and a bird commences picking at the meat scrap, its whole attention is directed to the meat scrap, as it cannot see any other feed at the time. This naturally tends to make the bird gorge itself on the meat scrap, which is detrimental to the fowl. However in the present improvement the close proximity of the several feeds one to the other is most advantageous, and a great improvement on the present methods of feeding poultry from feeders widely separated.

The troughs A, B, C, D, E and F are shown located at a sufficient distance above the floor that a bird, as 14', standing upon a suitable platform 21, will be able to eat readily from the various troughs and pass from one to the other, and the platform 21 is shown carried by brackets 22 at a sufficient height above the feeding floor 5, that a bird, as 14, may readily pass under it without inconvenience or having its attention distracted from the bait 13. The platform 21 in the present illustration is shown as of square formation, it being comprised of wooden strips which are secured at the ends to the brackets 22 so that the platform as a whole is supported at each corner. The ends of two of the platform strips rest upon each of the brackets.

It is a well recognized fact among poultry raisers that the birds in picking from a trough will sideswipe and otherwise spill the feed from the trough on to the floor, which feed is wasted more or less in the present methods of feeding by individual feeders. The troughs A, B, C, D, E and F are so disposed in relation to the discharge from the main container 1, that the food spilled from them falls upon the feeding floor in the zone of distribution of the scratch feed. Therefore the fowl exercising for the scratch feed discovers the feed which has fallen from these various troughs and eats it, which is a great economic and hygienic improvement over the old method where the spilled feed from individual feed boxes falls on the floor, becomes stagnant or mildewed, therefore unfit for feed, and remains there until the feed trough is empty, when the hungry birds then scratch around for the spilled feed, but the spilled feed then being in an unfit condition for food, the birds are liable to contract intestinal and other disorders detrimental to them. Such disorders cannot occur with my improved system of feeding, because the feed falling from the various troughs among the litter, is consumed by the birds exercising for the scratch feed before such spilled feed has had time to become sour or contaminated.

For the purpose of reducing the amount of feed which will be spilled from the troughs, each of these is provided with an inwardly directed flange 23, so that the feed which he disturbs with his beak will fall back into the trough.

Although but one practicable embodiment of the invention has been illustrated, it will be apparent that changes may be made within the scope of the claims, without departing from the spirit of the invention.

I claim as my invention:—

1. In a poultry feeder, the combination with a scratch feed container, and a spout for discharging the feed from the container, of a feed trough associated with the container and located in such position relatively to the said spout that spillings from the trough will fall within the zone of discharge of such spout.

2. In a poultry feeder, the combination with a scratch feed container, and a spout for discharging the feed from the container, of a plurality of feed troughs associated with the container and each located in such position relatively to the said spout that spillings from it will fall within the zone of discharge of such spout.

3. In a poultry feeder, the combination with a scratch feed container, and a spout for discharging the feed from the container, of a plurality of feed troughs associated with the container and each located in such position relatively to the said spout that spillings from it will fall within the zone of discharge of such spout, and a platform disposed outwardly of the troughs for the birds while feeding at the troughs.

4. In a poultry feeder, the combination with a scratch feed container, supporting means for maintaining the same above a feeding floor, and a spout for discharging the feed from the container upon the floor, of a feed trough carried by the supporting means above the floor and located in such position relatively to the said spout that spillings from the trough will fall upon the feeding floor within the zone of discharge of such spout.

5. In a poultry feeder, the combination with a scratch feed container, supporting means for maintaining the same above a feeding floor, and a spout for discharging the feed from the container upon the floor, of a plurality of feed troughs carried by the supporting means above the floor and each located in such position relatively to the said spout that spillings from it will fall upon the feeding floor within the zone of discharge of such spout.

6. In a poultry feeder, the combination with a scratch feed container, supporting means for maintaining the same above a feeding floor, and a spout for discharging the feed from the container upon the floor, of a plurality of feed troughs carried by the supporting means above the floor and each located in such position relatively to the said spout that spillings from it will fall upon the feeding floor within the zone of discharge of said spout, and a platform disposed outwardly of the troughs for the birds while feeding at the troughs.

7. In a poultry feeder, the combination with a scratch feed container, standards for maintaining the same above a feeding floor, and a spout for discharging the feed from the container upon the floor, of a feed trough carried by the standards above the floor and located in such position relatively to the said spout that spillings from the trough will fall upon the feeding floor within the zone of discharge of such spout.

8. In a poultry feeder, the combination with a scratch feed container, standards for maintaining the same above a feeding floor, and a spout for discharging the feed from the container upon the floor, of a plurality of feed troughs carried by the standards above the floor and each located in such position relatively to the said spout that spillings from it will fall upon the feeding floor within the zone of discharge of such spout.

9. In a poultry feeder, the combination with a scratch feed container, standards for maintaining the same above a feeding floor, and a spout for discharging the feed from the container upon the floor, of a plurality of feed troughs carried by the standards above the floor and each located in such position relatively to the said spout that spillings from it will fall upon the feeding floor within the zone of discharge of such spout, and a platform disposed outwardly of the troughs for the birds while feeding at the troughs.

10. In a poultry feeder, the combination with a main feed container provided with a spout, standards for maintaining the same above the feeding floor, a distributer for distributing the feed in a predetermined zone upon the floor, a platform carried by said standards at a sufficient distance above the floor that birds may freely pass below it, a plurality of feed troughs carried by the standards for birds upon said platform, said troughs and platform being so located relatively to the said zone of distribution of feed that the spillings from said trough will drop within said zone.

In witness whereof, I have hereunto signed my name in the presence of two subscribing witnesses.

JOEL M. FOSTER.

Witnesses:
RALPH H. HULICK,
H. G. McFAUL.

DISCLAIMER.

1,108,566.—*Joel M. Foster*, Brown Mills, N. J. POULTRY EXERCISER AND FEEDER. Patent dated August 25, 1914. Disclaimer filed February 6, 1915, by the patentee.

Enters this disclaimer to that part of the claim in said specification which is in the following words, to wit:

1. In a poultry feeder, the combination with a scratch feed container, and a spout for discharging the feed from the container, of a feed trough associated with the container and located in such position relatively to the said spout that spillings from the trough will fall within the zone of discharge of such spout.

2. In a poultry feeder, the combination with a scratch feed container, and a spout for discharging the feed from the container, of a plurality of feed troughs associated with the container and each located in such position relatively to the said spout that spillings from it will fall within the zone of discharge of such spout.

3. In a poultry feeder, the combination with a scratch feed container, and a spout for discharging the feed from the container, of a plurality of feed troughs associated with the container and each located in such position relatively to the said spout that spillings from it will fall within the zone of discharge of such spout, and a platform disposed outwardly of the troughs for the birds while feeding at the troughs.

4. In a poultry feeder, the combination with a scratch feed container, supporting means for maintaining the same above a feeding floor, and a spout for discharging the feed from the container upon the floor, of a feed trough carried by the supporting means above the floor and located in such position relatively to the said spout that spillings from the trough will fall upon the feeding floor within the zone of discharge of such spout.

5. In a poultry feeder, the combination with a scratch feed container, supporting means for maintaining the same above a feeding floor, and a spout for discharging the feed from the container upon the floor, of a plurality of feed troughs carried by the supporting means above the floor and each located in such position relatively to the said spout that spillings from it will fall upon the feeding floor within the zone of discharge of such spout.

6. In a poultry feeder, the combination with a scratch feed container, supporting means for maintaining the same above a feeding floor, and a spout for discharging the feed from the container upon the floor, of a plurality of feed troughs carried by the supporting means above the floor and each located in such position relatively to the said spout that spillings from it will fall upon the feeding floor within the zone of discharge of said spout, and a platform disposed outwardly of the troughs for the birds while feeding at the troughs.

7. In a poultry feeder, the combination with a scratch feed container, standards for maintaining the same above a feeding floor, and a spout for discharging the feed from the container upon the floor, of a feed trough carried by the standards above the floor and located in such position relatively to the said spout that spillings from the trough will fall upon the feeding floor within the zone of discharge of such spout.

8. In a poultry feeder, the combination with a scratch feed container, standards for maintaining the same above a feeding floor, and a spout for discharging the feed from the container upon the floor, of a plurality of feed troughs carried by the standards above the floor and each located in such position relatively to the said spout that spillings from it will fall upon the feeding floor within the zone of discharge of such spout.

9. In a poultry feeder, the combination with a scratch feed container, standards for maintaining the same above a feeding floor, and a spout for discharging the feed from the container upon the floor, of a plurality of feed troughs carried by the standards above the floor and each located in such position relatively to the said spout that spillings from it will fall upon the feeding floor within the zone of discharge of such spout, and a platform disposed outwardly of the troughs for the birds while feeding at the troughs.

10. In a poultry feeder, the combination with a main feed container provided with a spout, standards for maintaining the same above the feeding floor, a distributer for distributing the feed in a predetermined zone upon the floor, a platform carried by said standards at a sufficient distance above the floor that birds may freely pass below it, a plurality of feed troughs carried by the standards for birds upon said platform, said troughs and platform being so located relatively to the said zone of distribution of feed that the spillings from said trough will drop within said zone.

[*Official Gazette, February 16, 1915.*]